US011634609B2

(12) United States Patent
Lu et al.

(10) Patent No.: US 11,634,609 B2
(45) Date of Patent: Apr. 25, 2023

(54) POLYMERS, COATING COMPOSITIONS CONTAINING SUCH POLYMERS, AND ANTI-FINGERPRINT COATINGS FORMED THEREFROM

(71) Applicant: PPG Industries Ohio, Inc., Cleveland, OH (US)

(72) Inventors: Songwei Lu, Wexford, PA (US); Jiping Shao, Sewickley, PA (US); Hongying Zhou, Allison Park, PA (US); Zilu Li, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 137 days.

(21) Appl. No.: 16/618,665

(22) PCT Filed: May 30, 2018

(86) PCT No.: PCT/US2018/035126
§ 371 (c)(1),
(2) Date: Dec. 2, 2019

(87) PCT Pub. No.: WO2018/222712
PCT Pub. Date: Dec. 6, 2018

(65) Prior Publication Data
US 2020/0095461 A1    Mar. 26, 2020

Related U.S. Application Data

(60) Provisional application No. 62/514,450, filed on Jun. 2, 2017.

(51) Int. Cl.
| C09D 175/06 | (2006.01) |
| C08G 18/28 | (2006.01) |
| C08G 18/42 | (2006.01) |
| C08G 18/32 | (2006.01) |
| C08G 18/77 | (2006.01) |
| C09D 183/04 | (2006.01) |

(52) U.S. Cl.
CPC ......... *C09D 175/06* (2013.01); *C08G 18/289* (2013.01); *C08G 18/2865* (2013.01); *C08G 18/3203* (2013.01); *C08G 18/4269* (2013.01); *C08G 18/778* (2013.01); *C09D 183/04* (2013.01)

(58) Field of Classification Search
CPC .............................................. C09D 175/00–12
See application file for complete search history.

(56) References Cited

U.S. PATENT DOCUMENTS

| 5,766,769 | A | 6/1998 | Ohrbom et al. |
| 9,321,878 | B2 | 4/2016 | Huang et al. |
| 10,113,067 | B2 | 10/2018 | Koene et al. |
| 2004/0127671 | A1* | 7/2004 | Roesler ................ C09K 3/1021 528/38 |
| 2006/0047064 | A1 | 3/2006 | Murata et al. |
| 2008/0124532 | A1 | 5/2008 | Menovcik et al. |
| 2008/0194774 | A1* | 8/2008 | Kimura ................ C08G 63/912 525/440.03 |
| 2009/0018302 | A1* | 1/2009 | Laas ...................... C08G 71/04 528/19 |
| 2010/0035053 | A1 | 2/2010 | Kishi et al. |
| 2011/0034627 | A1* | 2/2011 | Boudet ................. C09J 175/04 524/588 |
| 2011/0046305 | A1 | 2/2011 | Schubert et al. |
| 2011/0082273 | A1* | 4/2011 | Laas .................... C09D 175/02 560/336 |
| 2014/0242323 | A1* | 8/2014 | Giorgini .................. H01L 23/10 428/76 |
| 2015/0090026 | A1 | 4/2015 | Imae et al. |
| 2015/0126678 | A1* | 5/2015 | Kramer ................ C08G 18/837 524/590 |
| 2015/0166719 | A1* | 6/2015 | Huang ................. C08G 18/163 524/588 |
| 2016/0159833 | A1 | 6/2016 | Kramer et al. |

(Continued)

FOREIGN PATENT DOCUMENTS

| CN | 1152013 A | 6/1997 |
| CN | 101802042 A | 8/2010 |
| CN | 101993522 A | 3/2011 |

(Continued)

OTHER PUBLICATIONS

Machine Translation of WO2009/144999 A1. Mar. 12, 2009. (Year: 2009).*
Kricheldorf et al., "Synthesis of trimethoxy- or triethoxysilane-endcapped polylactones via a bismuth(III) hexanoate-catalyzed one-pot-procedure", Journal of Biomaterials Science, Polymer Edition, 2006, pp. 721-733, vol. 17:7.
Kricheldorf et al., "Telechelic polylactones functionalized with trimethoxysilyl groups", Polymer, 2005, pp. 12103-12108, vol. 46.
Trollsas et al., "Hydrophilic Aliphatic Polyesters: Design, Synthesis, and Ring-Opening Polymerization of Functional Cyclic Esters", Macromolecules, 2000, pp. 4619-4627, vol. 33.

*Primary Examiner* — Stephen E Rieth
(74) *Attorney, Agent, or Firm* — Krisanne Shideler

(57) ABSTRACT

A substrate at least partially coated with an anti-fingerprint coating is prepared from a coating composition that includes: (a) an organic solvent; and (b) an alkoxysilane functional polymer having at least one ester linkage, at least one urethane linkage, and at least one alkoxysilane functional group. Further, the polymer is prepared from components including: (i) an active hydrogen functional compound having a hydroxyl group, amino group, thiol group, or a combination thereof; (ii) an intramolecular cyclic ester; and (iii) an isocyanate functional compound. The active hydrogen functional compound (i), the isocyanate functional compound (iii), or both (i) and (iii) have one or more alkoxysilane functional groups. Alkoxysilane functional polymers and coating compositions containing the same are also included.

4 Claims, 1 Drawing Sheet

(56) References Cited

U.S. PATENT DOCUMENTS

2016/0280955 A1   9/2016   Olson et al.

FOREIGN PATENT DOCUMENTS

| CN | 104744656 A | 7/2015 | |
|---|---|---|---|
| CN | 105765014 A | 7/2016 | |
| JP | 2004300320 A | 10/2004 | |
| JP | 200529723 A | 2/2005 | |
| JP | 2009215537 A | 9/2009 | |
| JP | 201168031 A | 4/2011 | |
| JP | 2016531905 A | 10/2016 | |
| JP | 2017503046 A | 1/2017 | |
| WO | 2007040232 A1 | 4/2007 | |
| WO | WO-2009144999 A1 * | 12/2009 | ......... C08G 18/6229 |
| WO | 2014014028 A1 | 1/2014 | |
| WO | WO-2015014726 A1 * | 2/2015 | ............. C08G 18/10 |

* cited by examiner

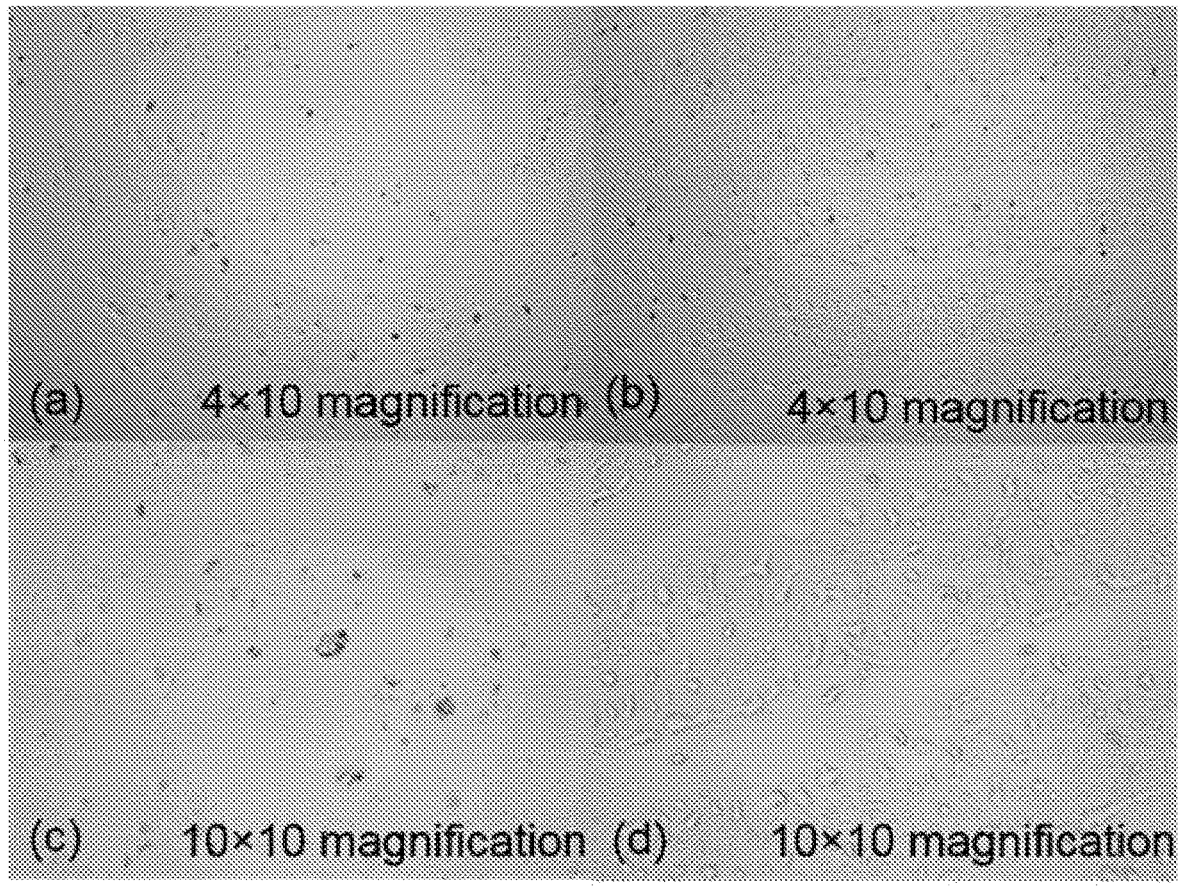

POLYMERS, COATING COMPOSITIONS CONTAINING SUCH POLYMERS, AND ANTI-FINGERPRINT COATINGS FORMED THEREFROM

CROSS REFERENCE TO RELATED APPLICATIONS

This application claims priority to U.S. Provisional Application No. 62/514,450, filed Jun. 2, 2017, which is incorporated herein by reference in its entirety.

FIELD OF THE INVENTION

The present invention relates to polymers, coating compositions containing the polymers, anti-fingerprint coatings formed from such compositions, and substrates coated with the anti-fingerprint coatings.

BACKGROUND OF THE INVENTION

Consumer electronic devices such as cellular phones, notebook monitors, television screens, and the like, often have touch screens or displays that allow a user to control the device by touching the screen or display. As a result, the screens and displays of these devices are readily marked with fingerprints when handled. For instance, the glass touch screen of a cellular phone, which is contacted with the hands and fingers, becomes readily marked with oils. To prevent or reduce the amount of marks and smudges, a fingerprint resistant coating can be applied to the surface of consumer electronic devices. It is, therefore, desirable to provide improved coatings that effectively mask or prevent fingerprint marks and smudges on the surface of substrates, such as the surface of consumer electronic devices.

SUMMARY OF THE INVENTION

The present invention relates to a substrate at least partially coated with an anti-fingerprint coating prepared from a coating composition comprising: (a) an organic solvent; and (b) an alkoxysilane functional polymer comprising at least one ester linkage and at least one urethane linkage. The polymer is prepared from components comprising: (i) an active hydrogen functional compound comprising a hydroxyl group, amino group, thiol group, or a combination thereof; (ii) an intramolecular cyclic ester; and (iii) an isocyanate functional compound. The active hydrogen functional compound (i), the isocyanate functional compound (iii), or both (i) and (iii) comprise one or more alkoxysilane functional groups.

The present invention also relates to an alkoxysilane functional polymer comprising at least one ester linkage, at least one urethane linkage, and at least two alkoxysilane functional groups. Further, the polymer is prepared from components comprising: (i) an active hydrogen functional compound selected from: (a) an active hydrogen functional polymer comprising one or more hydroxyl groups, amino groups, thiol groups, or combinations thereof; (b) a non-polymeric compound comprising an amino group; or (c) a combination thereof; (ii) an intramolecular cyclic ester; and (iii) an isocyanate functional compound. The active hydrogen functional compound (i), the isocyanate functional compound (iii), or both (i) and (iii) comprise one or more alkoxysilane groups. In addition, the present invention includes a coating composition comprising the previously described alkoxysilane functional polymer and an organic solvent.

BRIEF DESCRIPTION OF THE DRAWINGS

FIG. 1 illustrates fingerprints on the coated portion of a soda lime glass coated with a coating composition in accordance with the present invention in (a) and (c) and fingerprints on uncoated soda lime glass in (b) and (d).

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" coating composition, and the like refer to one or more of any of these items.

The present invention is directed to alkoxysilane functional polymers that can be incorporated into coating compositions to form anti-fingerprint coatings over a substrate. The term "anti-fingerprint coating" refers to a coating that masks or prevents fingerprint marks and smudges. Further, the term "silane" refers to a compound derived from $SiH_4$ by substituting organic groups for at least some of the hydrogen atoms, and the term "alkoxy" refers to an —O— alkyl group. As such, an "alkoxysilane" refers to a silane compound having at least one alkoxy group, such as two alkoxy groups or three alkoxy groups, bonded to a silicon atom.

Moreover, as used herein, the term "polymer" refers to oligomers and homopolymers (e.g., prepared from a single monomer species), copolymers (e.g., prepared from at least two monomer species), and graft polymers. The term "resin" is used interchangeably with "polymer." As indicated, polymers described herein can be used to form a film as part of a coating. A "film-forming resin" refers to resins that can form a self-supporting continuous film on at least a horizontal surface of a substrate upon removal of any diluents or carriers present in the composition.

In accordance with the present invention, the alkoxysilane functional polymers of the present invention include at least one ester linkage, at least one urethane linkage, and one or more alkoxysilane functional groups per molecule. An "ester linkage" refers to an ester group represented by —C(=O)—O— that is formed between two molecules or groups such as during polymerization, and a "urethane linkage" refers to a urethane group represented by —O—C(=O)—NH— that is formed between two molecules or groups such as during polymerization. The polymers of the present invention generally comprise at least one ester linkage and at least one urethane linkage per molecule. The polymers of the present invention can also comprise multiple ester linkages and/or urethane linkages per molecule. It is appreciated that the polymers of the present invention can include additional linkages including, but not limited to, amide linkages, urea linkages, Si—C linkages, and combinations thereof.

The alkoxysilane functional polymers are prepared with components comprising: (i) an active hydrogen functional compound comprising a hydroxyl group, amino group, thiol group, or combinations thereof; (ii) an intramolecular cyclic ester such as for example a lactide, lactone, glycolide, or a combination thereof; and (iii) an isocyanate functional compound. The active hydrogen functional compound (i), the isocyanate functional compound (iii), or both (i) and (iii) comprise one or more alkoxysilane groups.

As used herein, an "active hydrogen functional compound" refers to a compound that includes a hydrogen that readily dissociates as a proton. As previously described, the active hydrogen functional compound comprises a hydroxyl group, amino group, thiol group, or combinations thereof. Thus, the active hydrogen functional compound comprises a hydroxyl group, an amino group, and/or a thiol group having a hydrogen that readily dissociates as a proton. The active hydrogen functional compound can comprise one or multiple hydroxyl groups, amino groups, and/or thiol groups. Further, the amino group can include a primary amino group or a secondary amino group. A "primary amino group" refers to a functional group represented by the structural formula —NH$_2$, and a "secondary amino group" refers to a functional group represented by the structural formula —NRH in which R is an alkyl group, aryl group, or alkylaryl group.

Non-limiting examples of an active hydrogen functional compound that comprises a hydroxyl group, amino group, and/or thiol group include aliphatic and aromatic compounds. As used herein, the term "aliphatic" refers to a non-aromatic straight, branched, or cyclic hydrocarbon structure that contains saturated carbon bonds, and the term "aromatic" refers to a cyclically conjugated hydrocarbon with a stability (due to a delocalization of electrons) that is significantly greater than that of a hypothetical localized structure.

Non-limiting examples of suitable active hydrogen functional compounds are represented by R—OH, R—SH, R—NH, and R—NH—R in which R is an alkyl group, an aryl group, or an alkylaryl group. As used herein, an "alkyl group" refers to a linear, branched, and/or cyclic monovalent, saturated hydrocarbon radical. The alkyl group may include, but is not limited to, a linear or branched $C_1$-$C_{30}$ monovalent hydrocarbon radical, or a linear or branched $C_1$-$C_{20}$ monovalent hydrocarbon radical, or a linear or branched $C_1$-$C_{10}$ monovalent hydrocarbon radical, or a linear or branched $C_1$ to $C_6$ monovalent hydrocarbon radical, or a linear or branched $C_2$ to $C_4$ monovalent hydrocarbon radical such as for example ethyl, n-propyl or iso-propyl. The alkyl group may also include, but is not limited to, a cyclic $C_3$-$C_{19}$ monovalent hydrocarbon radical, or a cyclic $C_3$-$C_{12}$ monovalent hydrocarbon radical, or a cyclic $C_5$-$C_7$ monovalent hydrocarbon radical such as for example cyclohexyl. Further, the alkyl group can optionally comprise an interrupting heteroatom, functional group, or a combination thereof. For example, the alkyl group can be interrupted by: (i) a heteroatom including, but not limited to, an oxygen atom, a nitrogen atom, a sulfur atom, or a combination thereof; and/or (ii) a functional group including, but not limited to, an ester group, an ether group, a carbonyl group, an amide group, or combinations thereof. Alternatively, the alkyl group can be free of interrupting heteroatoms and/or functional groups.

The term "linear" refers to a compound having a straight hydrocarbon chain, the term "branched" refers to a compound having a hydrocarbon chain with a hydrogen replaced by a sub stituent such as an alkyl group that branches or extends out from a straight chain, and the term "cyclic" refers to a closed ring structure. The cyclic groups also encompass bridged ring polycycloalkyl groups (or bridged ring polycyclic groups) and fused ring polycycloalkyl groups (or fused ring polycyclic groups).

An "aryl group" refers to an aromatic cyclic monovalent hydrocarbon radical. The aryl group may include, but is not limited to, a cyclic $C_3$-$C_{19}$ aromatic monovalent hydrocarbon radical, or an aromatic cyclic $C_3$-$C_{12}$ monovalent hydrocarbon radical, or an aromatic cyclic $C_6$-$C_{10}$ monovalent hydrocarbon radical such as for example phenyl. Further, an "alkylaryl" group refers to an aryl group that is attached to an alkyl group such as for example benzyl, tolyl or xylyl.

The active hydrogen functional compound can also be selected from a polymer having one or more, such as two or more, hydroxyl groups, amino groups, and/or thiol groups per molecule. For example, the active hydrogen functional compound can comprise a polymer having at least three, such as four or more, or five or more, hydroxyl groups, amino groups, and/or thiol groups per molecule. The polymer can comprise terminal and/or pendant hydroxyl groups, amino groups, and/or thiol groups. A "pendant group," also referred to as a "side group", is an offshoot from the polymer main chain and is not part of the main chain, and a "terminal group" refers to a functional group positioned at the end of the polymer main chain. As such, the functional groups can be positioned on one or both terminal ends of the backbone, or main chain, of the polymer as well as from a side of the backbone of the polymer.

The polymer comprising hydroxyl groups, amino groups, and/or thiol groups can also have a particular polymer architecture. For example, the polymer can have a linear type architecture or a branched type architecture. As used herein, a "branched polymer" refers to a polymer comprising one or more side chains, such as two or more side chains, or three or more side chains, that extend from the main chain of the polymer.

As previously described, the active hydrogen functional compound can comprise one or more alkoxysilane groups, such as at least two alkoxysilane groups. For example, the active hydrogen functional compound can comprise an amino group and at least two alkoxysilane groups. Non-limiting examples of such compounds are represented by Z—NH—Z in which each Z is independently a group represented by

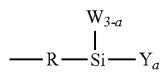

in which a is a number from 1 to 3, R is an alkylene group, W is an alkyl group, and Y is an alkoxy group.

As used herein, the term "alkylene" refers to a linear, branched, and/or cyclic divalent, saturated hydrocarbon radical. The alkylene group may include, but is not limited to, a linear or branched $C_1$-$C_{30}$ divalent hydrocarbon radical, or linear or branched $C_1$-$C_{20}$ divalent hydrocarbon radical, or linear or branched $C_1$-$C_{10}$ divalent hydrocarbon radical, or a linear or branched $C_1$ to $C_6$ divalent hydrocarbon radical, or a linear or branched $C_2$ to $C_4$ divalent hydrocarbon radical. The alkylene group may also include, but is not limited to, a cyclic $C_3$-$C_{19}$ divalent hydrocarbon radical, or a cyclic $C_3$-$C_{12}$ divalent hydrocarbon radical, or a cyclic $C_5$-$C_7$ divalent hydrocarbon radical. Further, the alkylene group can optionally comprise an interrupting heteroatom, functional group, or a combination thereof. The interrupting heteroatom and functional group can include, but is not limited to, any of the heteroatoms and functional groups previously described. For instance, the alkylene group can comprise interrupting ester linkages. Alternatively, the alkylene group can be free of additional interrupting heteroatoms and/or functional groups.

The active hydrogen functional compound can also comprise additional functional groups. Non-limiting examples of additional functional groups include carboxylic acid groups, epoxide groups, carbamate groups, amide groups, urea groups, and combinations thereof. The active hydrogen functional compound can also be free of all other functional groups and only include hydroxyl groups, amino groups, and/or thiol groups, and optionally alkoxysilane groups.

The active hydrogen functional compound can comprise at least 0.1 weight %, at least 0.5 weight %, or at least 1 weight %, based on the total weight of the reactive components used to form the alkoxysilane functional polymer. The active hydrogen functional compound can comprise up to 20 weight %, up to 15 weight %, or up to 10 weight %, based on the total weight of the reactive components used to form the alkoxysilane functional polymer. The amount of the active hydrogen functional compound can also be selected within a range such as from 0.1 to 20 weight %, from 0.5 to 15 weight %, or from 1 to 10 weight %, based on the total weight of the reactive components used to form the alkoxysilane functional polymer.

As indicated, the components that form the alkoxysilane functional polymers of the present invention further include an intramolecular cyclic ester. The intramolecular cyclic ester can comprise, for example, a cyclic mono-ester or di-ester. Non-limiting examples of intramolecular cyclic esters include a lactone, lactide, glycolide, or a combination thereof. A "lactone" refers to a cyclic ester having a ring structure with two or more carbon atoms and a single oxygen atom with a ketone group in one of the carbons adjacent to the other oxygen. A "lactide" refers to a cyclic di-ester obtained from two or more molecules of lactic acid, and a "glycolide" refers to a cyclic ester obtained by dehydration of two water molecules from two glycolic acid molecules. Non-limiting examples of suitable lactones include ε-caprolactone, β-propiolactone, γ-butyrolactone, δ-valerolactone, and combinations thereof. Non-limiting examples of suitable lactides include L-lactide, D-lactide, DL-lactide, and combinations thereof.

The lactone, lactide, and/or glycolide can comprise at least 10 weight %, at least 30 weight %, at least 50 weight %, or at least 70 weight %, based on the total weight of the reactive components used to form the alkoxysilane functional polymer. The lactone, lactide, and/or glycolide can comprise up to 95 weight %, up to 90 weight %, or up to 85 weight %, based on the total weight of the reactive components used to form the alkoxysilane functional polymer. The amount of the lactone, lactide, and/or glycolide can also be selected within a range such as from 10 to 95 weight %, from 50 to 95 weight %, or from 70 to 90 weight %, based on the total weight of the reactive components used to form the alkoxysilane functional polymer.

The components that form the alkoxysilane functional polymers of the present invention also include an isocyanate functional compound. The isocyanate functional compound can be selected from aliphatic and aromatic isocyanate functional compounds and can include one or multiple isocyanate functional groups. Non-limiting examples of suitable isocyanate functional compounds are represented by R—NCO in which R is an alkyl, aryl, or alkylaryl group.

As previously described, the isocyanate functional compound can also include one or more alkoxysilane groups. For instance, the isocyanate functional compound comprising an alkoxysilane group can be represented by

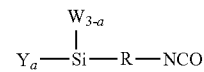

in which a is a number from 1 to 3, R is an alkylene group, W is an alkyl group, and Y is an alkoxy group. A commercially available isocyanate functional compound having an alkoxysilane group that can for example be used according to the present invention is sold by Momentive Performance Materials under the tradename SILQUEST® A-link 35.

In some examples, the components that form the alkoxysilane functional polymers of the present invention comprise two or more different isocyanate functional compounds. For example, the components that form the alkoxysilane functional polymers of the present invention can comprise a first isocyanate functional compound comprising an alkoxysilane group, and a second isocyanate functional compound comprising an aromatic group and which is different from the first isocyanate compound. It is appreciated that the second isocyanate functional compound is free of alkoxysilane groups.

The isocyanate functional compound can comprise at least 0.1 weight %, at least 1 weight %, or at least 5 weight %, based on the total weight of the reactive components used to form the alkoxysilane functional polymer. The isocyanate functional compound can comprise up to 50 weight %, up to 40 weight %, up to 30 weight %, up to 20 weight %, or up to 15 weight %, based on the total weight of the reactive components used to form the alkoxysilane functional polymer. The amount of the isocyanate functional compound can also be selected within a range such as from 0.1 to 50 weight %, from 1 to 20 weight %, or from 5 to 15 weight %, based on the total weight of the reactive components used to form the alkoxysilane functional polymer.

During preparation of the alkoxysilane functional polymers of the present invention, the active hydrogen functional compound is commonly first reacted with the lactone, lactide, and/or glycolide. It is appreciated that this reaction ring opens the lactone, lactide, and/or glycolide. The reaction product formed by reacting the active hydrogen functional compound with the lactone, lactide, and/or glycolide may then be reacted with one or more isocyanate functional compounds to produce the alkoxysilane functional polymers of the present invention. The previously described reaction steps can take place under heat such as at a temperature within a range from 120° C. to 140° C. in a first step and from 60° C. to 80° C. in a second step. For example, the reaction can take place in the first step at a temperature of 130° C. until IR spectroscopy shows the absence of a characteristic lactone, lactide, or glycolide band using an FT-IR spectrometer such as a ThermoScientific Nicolet iS5 FT-IR. Then, in the second step, the reaction can take place at a temperature of 70° C. until IR spectroscopy shows the absence of a characteristic NCO band using an FT-IR spectrometer such as a ThermoScientific Nicolet iS5 FT-IR.

In addition, the previously described components can, optionally, be reacted in the presence of a catalyst. For instance, the reaction between the active hydrogen functional compound and the lactone, lactide, and/or glycolide can occur in the presence of a catalyst. Non-limiting examples of suitable catalysts include metal and salt catalysts.

The previously described components can also, optionally, be mixed and reacted in an organic solvent. As used herein, the term "organic solvent" refers to a liquid medium that comprises more than 50 weight % and up to 100 weight % of organic solvent compounds. Non-limiting examples of suitable organic solvent compounds include polar organic solvent compounds, e.g. protic organic solvent compounds such as glycols, glycol ether alcohols, alcohols; and aprotic organic solvent compounds such as ketones, glycol diethers, esters, and diesters. Other non-limiting examples of organic solvent compounds include non-polar solvent compounds such as aromatic and aliphatic hydrocarbons. The liquid medium used as the organic solvent can be substantially free of water or comprise water in an amount of up to less than 50 weight %, based on the total weight of the liquid medium. In accordance with the present invention, such liquid mediums can comprise less than 40 weight % water, or less than 30 weight % water, or less than 20 weight % water, or less than 10 weight % water, or less than 5 weight % water, based on the total weight of the liquid medium.

The alkoxysilane functional polymer can have comprise a weight average molecular weight of at least 500 g/mol, or at least 1,000 g/mol, or at least 1,500 g/mol, or at least 2,000 g/mol. The weight average molecular weight is determined by Gel Permeation Chromatography using a Waters 2695 separation module with a Waters 410 differential refractometer (RI detector) and polystyrene standards for calibration. Tetrahydrofuran (THF) is used as the eluent at a flow rate of 1 ml min$^{-1}$, and two PL Gel Mixed C columns are used for separation.

In some non-limiting examples, the components that form the alkoxysilane functional polymer comprise: an active hydrogen functional compound having a hydroxyl group; a lactone, lactide, or glycolide; and an isocyanate functional compound having an alkoxysilane group. Examples of polymers obtainable from such components are represented by the following Chemical Formula (I):

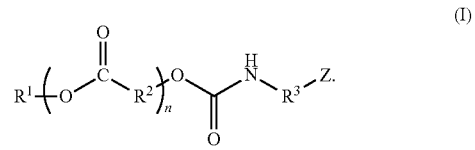

With respect to Chemical Formula (I), n is a number from 5 to 50, $R^1$ is an alkyl group, aryl group, or an alkylaryl group, $R^2$ and $R^3$ are each independently an alkylene group, and Z is a group represented by

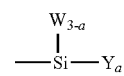

in which a is a number from 1 to 3, W is an alkyl group, and Y is an alkoxy group. It is appreciated that the alkylene of $R^2$ is commonly interrupted by an ester group.

In another non-limiting example, the components that form the alkoxysilane functional polymer comprise: an active hydrogen functional compound having an amino group and at least two alkoxysilane groups; a lactone, lactide, or glycolide; and an isocyanate functional compound that is free of alkoxysilane groups. Examples of such polymers are represented by the following Chemical Formula (II):

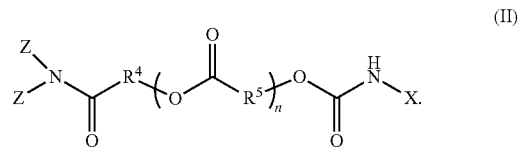

With respect to Chemical Formula (II), n is a number from 5 to 50, $R^4$ and $R^5$ are each independently an alkylene group, X is an alkyl group, aryl group, or alkylaryl group, and each Z is independently a group represented by

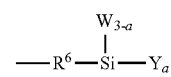

in which a is a number from 1 to 3, $R^6$ is an alkylene group, W is an alkyl group, and Y is an alkoxy group. It is appreciated that the alkylene of $R^5$ is commonly interrupted by an ester group.

As previously described, the active hydrogen functional compound can comprise an active hydrogen functional polymer having one or more, such as two or more hydroxyl groups, amino groups, and/or thiol groups. For instance, the components that form the alkoxysilane functional polymer can comprise: an active hydrogen functional polymer having at least three hydroxyl groups per molecule; a lactone, lactide, or glycolide; and at least one isocyanate functional compound having an alkoxysilane group. The resulting alkoxysilane functional polymer comprises at least one terminal and/or pendant chain having an alkoxysilane group. Examples of the terminal and/or pendant chains having an alkoxysilane group can be represented by Chemical Formula (III):

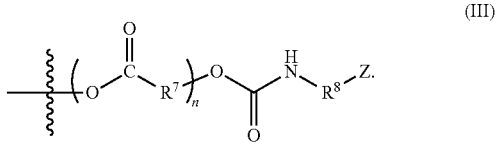

(III)

With respect to Chemical Formula (III), n is a number from 5 to 50, $R^7$ and $R^8$ are each independently an alkylene group, and Z is a group represented by

in which a is a number from 1 to 3, W is an alkyl group, and Y is an alkoxy group. The alkoxysilane functional chains represented by Chemical Formula (III) can be positioned at one or both terminal ends and on a side chain(s) of the polymer of the present invention.

Additional isocyanate functional compounds that are free of alkoxysilane groups can also be used to react with some of the hydroxyl groups available in the reaction mixture. Examples of isocyanate functional compounds that are free of alkoxysilane groups can be represented by R—NCO in which R is an alkyl, aryl, or alkylaryl group, which can be any alkyl, aryl, or alkylaryl group as described above. The resulting alkoxysilane functional polymer can comprise at least one terminal and/or pendant chain having an alkoxysilane group represented by Chemical Formula (III) as well as at least one terminal and/or pendant chain represented by Chemical Formula (IV):

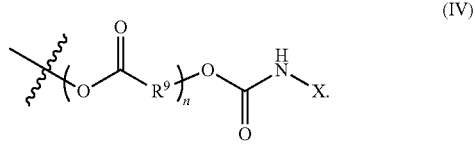

(IV)

With respect to Chemical Formula (IV), n is a number from 5 to 50, $R^9$ is an alkylene group and X is an alkyl group, aryl group, or alkylaryl group. The alkoxysilane functional chains represented by Chemical Formula (IV) can be positioned at one or both terminal ends and/or on a side chain(s) of the polymer of the present invention provided that at least one terminal and/or pendant chain having an alkoxysilane group, such as represented by Chemical Formula (III), is also positioned on the polymer of the present invention.

The present invention is further directed to a coating composition that comprises the previously described alkoxysilane functional polymer. The coating composition can comprise one type of alkoxysilane functional polymer according to the present invention. Alternatively, the coating composition can comprise a mixture of different types of the previously described alkoxysilane functional polymers according to the present invention.

The alkoxysilane functional polymer of the present invention can comprise at least 0.05 weight % or at least 0.1 weight %, based on the total weight of the coating composition. The alkoxysilane functional polymer of the present invention can comprise up to 10 weight %, up to 8 weight %, up to 5 weight %, or up to 3 weight %, based on the total weight of the coating composition. The amount of the alkoxysilane functional polymer can also be selected within a range such as from 0.05 to 10 weight %, from 0.05 to 8 weight %, or from 0.1 to 3 weight %, based on the total weight of the coating composition.

The coating composition according to the present invention also comprises an organic solvent. The organic solvent can comprise any of the organic solvents previously described. The organic solvent can comprise at least 50 weight %, at least 75 weight %, at least 90 weight %, at least 95 weight %, or at least 98 weight %, based on the total weight of the coating composition.

The coating composition can optionally further include a catalyst such as an acid catalyst, a base catalyst, or a combination thereof. The acid catalyst can include, but is not limited to, carboxylic acids, hydrogen halides, sulfuric acid, nitric acid, or combinations thereof. Non-limiting examples of suitable carboxylic acids include formic acid, acetic acid, propionic acid, butyric acid, capric acid, benzoic acid, and combinations thereof, and non-limiting examples of hydrogen halides include, but are not limited to, hydrogen fluoride, hydrogen chloride, hydrogen bromide, and combinations thereof. Further, non-limiting examples of base catalysts include ammonium hydroxide, N, N-dimethylbenzenylamine, sodium hydroxide, sodium carbonate, and combination thereof.

The coating composition of the present invention can also include other optional materials. For example, the coating composition can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures or combinations thereof. The terms "pigment" and "colored filler" can be used interchangeably.

Example dyes include, but are not limited to, those that are solvent and/or aqueous based such as phthalo green or blue, iron oxide, bismuth vanadate, and mixtures or combinations thereof.

Example tints include, but are not limited to, pigments dispersed in water-based or water-miscible carriers such as AQUA-CHEM 896 commercially available from Degussa, Inc., CHARISMA COLORANTS, and MAXITONER INDUSTRIAL COLORANTS commercially available from Accurate Dispersions Division of Eastman Chemical, Inc.

Other non-limiting examples of materials that can be used with the coating compositions of the present invention include plasticizers, abrasion resistant particles, fillers including, but not limited to, micas, talc, clays, and inorganic minerals, anti-oxidants, surfactants, flow and surface control agents, thixotropic agents, reactive diluents, reaction inhibitors, and other customary auxiliaries.

It is appreciated that the coating composition of the present invention can be free of additional resins and/or crosslinkers other than those previously described. Alternatively, the coating composition of the present invention can include additional resins and/or crosslinkers. The additional resins can include any of a variety of thermoplastic and/or thermosetting resins known in the art. As used herein, the term "thermosetting" refers to resins that "set" irreversibly upon curing or crosslinking, wherein the polymer chains are joined together by covalent bonds. This property is usually associated with a cross-linking reaction often induced, for example, by heat or radiation. Curing or crosslinking reactions also may be carried out under ambient conditions. Once cured, a thermosetting resin will not melt upon the application of heat and is insoluble in solvents. As noted, the additional resins can also include a thermoplastic resin. As used herein, the term "thermoplastic" refers to resins that include polymeric components that are not joined by covalent bonds and, thereby, can undergo liquid flow upon heating and are soluble in solvents.

The additional resins can be selected from, for example, polyurethanes, acrylic polymers, polyester polymers, polyamide polymers, polyether polymers, polysiloxane polymers, epoxy resins, vinyl resins, copolymers thereof, and mixtures thereof. Thermosetting resins typically comprise reactive functional groups. The reactive functional groups can include, but are not limited to, carboxylic acid groups, amine groups, epoxide groups, alkoxy groups, hydroxyl groups, thiol groups, carbamate groups, amide groups, urea groups, isocyanate groups (including blocked isocyanate groups), and combinations thereof.

Coating compositions containing thermosetting resins typically comprise a crosslinker known in the art to react with the functionality on the thermosetting resins. As used herein, the term "crosslinker" refers to a molecule comprising two or more functional groups that are reactive with other functional groups and which is capable of linking two or more monomers or polymer molecules through chemical bonds. The thermosetting resins can also have functional groups that are reactive with themselves; in this manner, such resins are self-crosslinking.

Non-limiting examples of crosslinkers include carbodiimides, polyhydrazides, aziridines, epoxy resins, alkylated carbamate resins, (meth)acrylates, isocyanates, blocked isocyanates, polyacids, polyamines, polyamides, aminoplasts, melamines, hydroxyalkyl ureas, hydroxyalkyl amides, and any combination thereof.

In some examples, the coating compositions of the present invention further comprise one or more additional silicone polymers having alkoxy groups. Commercially available silicone polymers that can be used with the coating compositions of the present invention are sold by Dow Corning under the tradenames DOW CORNING® 3074 INTERMEDIATE, DOW CORNING® 3037 INTERMEDIATE, DOW CORNING® US-CF-2403, DOW CORNING® US-CF 2405, and DOW CORNING® RSN-5314, and by Wacker under the tradename SILRES® IC 235. Commercially available silicone polymers are also sold by Shin-Etsu under the tradenames KR-510, X-40-9227, KR-480, KR-311, and KR-300. Other non-limiting examples of silicone polymers that can be used with the coating compositions of the present invention are disclosed in U.S. Patent Application Publication No. 2016/0280955 at paragraphs [0011] to [0075] and the Examples described therein, which is incorporated herein by reference.

The coating compositions of the present invention can be prepared by forming an alkoxysilane functional polymer as previously described, and then mixing the polymer in the organic solvent. Alternatively, the organic solvent can be introduced directly in the polymerization step. Optionally, any of the other previously described components, can be mixed with the polymer. The coating composition can then be applied at least partially over a substrate. The coating composition of the present invention can be applied to a wide range of substrates known in the coatings industry.

Non-limiting examples of suitable substrates include automotive substrates, industrial substrates, packaging substrates, aerocraft and aerocraft components, marine substrates and components such as ships, vessels, and on-shore and off-shore installations, wood flooring and furniture, apparel, electronics, including housings and circuit boards, glass and transparencies, sports equipment, including golf balls, and the like. These substrates can be, for example, metallic or non-metallic. Further, the substrates coated with the coating compositions of the present invention typically have at least one flat surface, and often have two opposing surfaces. Either one or both surfaces may be coated with the coatings of the present invention.

Non-metallic substrates include polymeric, plastic, polyolefin, cellulosic, polystyrene, polyacrylic, poly(ethylene naphthalate), nylon, EVOH, polylactic acid, polycarbonate, blends of polycarbonate and acrylonitrile butadiene styrene copolymer (PC/ABS), wood, veneer, wood composite, particle board, medium density fiberboard, cement, stone, sapphire, glass, paper, cardboard, textiles, leather, both synthetic and natural, and the like.

Specific non-limiting examples of suitable plastic substrates include substrates prepared from polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea urethane) polymers, which are prepared, for example, by the reaction of a polyurethane prepolymer and a diamine curing agent, a composition for one such polymer being sold under the trademark TRIVEX® by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; polyamide; triacetate (TAC); cyclo olefin polymer (COP); poly(ethoxylated Bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from Bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and, optionally, ethylenically unsaturated monomers or halogenated aromatic-containing vinyl monomers. Copolymers of such monomers and blends of the described polymers and copolymers with other polymers can also be used, e.g., to form interpenetrating network products.

Examples of metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. The metallic substrates can also include highly polished stainless steel substrates.

Non-limiting examples of glass substrates include soda-lime-silica glass such as conventional untinted soda-lime-silica glass, i.e., "clear glass", or tinted or otherwise colored glass, borosilicate glass, aluminosilicate glass such as GORILLA® glass (commercially available from Corning, Inc.) or Dragontrail® glass (commercially available from Asahi Glass Co., Ltd), leaded glass, tempered, untempered, annealed, or heat-strengthened glass. The glass may be of any type, such as conventional float glass or flat glass, and may be of any composition having any optical properties such as a transparent glass substrate.

The coating composition of the present invention is particularly useful when applied to glass substrates, plastic substrates, and combinations thereof that are found on consumer electronic products. The substrates can be transparent and have at least one flat surface. For example, the coating compositions of the present invention can be applied to glass and/or plastic substrates found on laptops, tablets, cellular phones, other handheld electronic devices, and the like that can be controlled by a person's fingers. As such, the glass and/or plastic substrates of such devices can comprise a touch screen or display.

The coating compositions of the present invention can be applied by various means known in the art including, but not limited to, spraying, spin coating, dip coating, or a combination thereof. After the coating compositions are applied to a substrate, the compositions can be dried or cured at ambient conditions, with heat, or with other means such as actinic radiation to form a coating. In some examples, the coating compositions of the present invention are heated at temperature within a range of 50° C. to 150° C., or from 75° C. to 125° C., or from 90° C. to 110° C., to form a coating over the surface of the substrate.

As used herein, the term "ambient conditions" refers to the conditions of the surrounding environment (e.g., the temperature, humidity, and pressure of the room or outdoor environment in which the substrate is located). The term "actinic radiation" refers to electromagnetic radiation that can initiate chemical reactions. Actinic radiation includes, but is not limited to, visible light, ultraviolet (UV) light, X-ray, and gamma radiation.

The coatings of the present invention can be applied and cured to a dry film thickness of from 2 nm to 50 nm, or from 5 nm to 25 nm, or 10 nm to 20 nm.

It is appreciated that the coating compositions of the present invention can be applied directly onto the surface of a substrate to form a coating layer directly over the surface of the substrate. Alternatively, the coating compositions of the present invention can be applied over a first coating layer such as a first coating layer formed on the surface of an electronic device comprising a touch screen or display. As such, the coating compositions of the present invention can be applied over a first coating layer and cured to form a second top coating layer.

The coatings deposited from the coating compositions described herein have been found to exhibit good anti-fingerprint properties. That is, the coatings of the present invention can reduce or prevent marks and smudges from fingers on the surface of a substrate. The coatings also exhibit good durability based on measuring water contact angles. The water contact angles are determined by a VCA optima contact angle measurement system available from AST Products, Inc. following the instruction manual of the VCA optima contact angle measurement system. The coatings deposited from the coating compositions described herein also exhibit other properties desired in a coating including, but not limited to, good adhesion.

The following examples are presented to demonstrate the general principles of the invention. The invention should not be considered as limited to the specific examples presented. All parts and percentages in the examples are by weight unless otherwise indicated.

Example 1

Preparation of an Alkoxysilane Functional Polymer

An alkoxysilane functional polymer was prepared from the components listed in Table 1.

TABLE 1

| Component | Parts by weight |
|---|---|
| Charge A | |
| Butyl acetate | 32.44 |
| Benzyl alcohol | 10.81 |
| D,L-Lactide | 115.30 |
| Butyl Stannoic Acid | 1.36 |
| Triphenyl Phosphite | 1.36 |
| Charge B | |
| Dibutyl tin dilaurate | 0.08 |
| Charge C | |
| SILQUEST ® A-link 35[1] | 20.53 |
| Charge D | |
| Methyl ethyl ketone | 82.11 |

[1]Isocyanatopropyl trimethoxy silane, commercially available from Momentive Performance Materials.

Charge A was added to a 500 mL, 4-necked flask equipped with a motor driven stainless steel stir blade, a water-cooled condenser, a nitrogen blanket, and a heating mantle with a thermometer connected through a temperature feedback control device. The reaction mixture was heated to 130° C. and held at 130° C. until IR spectroscopy showed the absence of the characteristic lactide band (936 cm-1) using a ThermoScientific Nicolet iS5 FT-IR. After the reaction was complete, the reaction mixture was cooled to 70° C. Then charge B was added at 70° C. followed by an addition of charge C over 30 minutes. Charge D was next added into the flask as a rinse of charge C. The reaction mixture was held at 70° C. until IR spectroscopy showed the absence of the characteristic NCO band (2269 cm-1) using the ThermoScientific Nicolet iS5 FT-IR. The reaction product was cooled to room temperature and filtered through a paint strainer. The resulting silane functional polyester had a solids content of 54.57% and a weight average molecular weight (Mw) of 2545 g/mol.

The weight average molecular weight was determined by Gel Permeation Chromatography using a Waters 2695 separation module with a Waters 410 differential refractometer (RI detector) and polystyrene standards. Tetrahydrofuran (THF) was used as the eluent at a flow rate of 1 ml min$^{-1}$, and two PL Gel Mixed C columns were used for separation.

Example 2

Preparation of an Alkoxysilane Functional Polymer

An alkoxysilane functional polymer was prepared from the components listed in Table 2.

TABLE 2

| Component | Parts by weight |
|---|---|
| Charge A | |
| Butyl acetate | 86.51 |
| Benzyl alcohol | 10.81 |
| ε-caprolactone | 171.21 |
| Stannous Octoate | 0.23 |
| Charge B | |
| SILQUEST ® A-link 35[1] | 20.53 |
| Charge C | |
| Butyl acetate | 82.11 |

Charge A was added to a 500 mL, 4-necked flask equipped with a motor driven stainless steel stir blade, a water-cooled condenser, a nitrogen blanket, and a heating mantle with a thermometer connected through a temperature feedback control device. The reaction mixture was heated to 130° C. and held at 130° C. until IR spectroscopy showed the absence of the characteristic ε-caprolactone double peaks band (850 and 860 cm-1) using a ThermoScientific Nicolet iS5 FT-IR. After the reaction was complete, the reaction mixture was cooled to 70° C. At 70° C., charge B was added over 30 minutes and followed by a rinse with charge C. The reaction mixture was held at 70° C. until IR spectroscopy showed the absence of the characteristic NCO band (2269 cm-1) using the ThermoScientific Nicolet iS5 FT-IR. The reaction product was cooled to room temperature and filtered through a paint strainer. The resulting silane functional polyester had a solids content of 54.18% and a Mw of 2933 g/mol. The Mw was determined as described in Example 1.

Example 3

Preparation of an Alkoxysilane Functional Polymer

An alkoxysilane functional polymer was prepared from the components listed in Table 3.

TABLE 3

| Component | Parts by weight |
|---|---|
| Charge A | |
| Butyl acetate | 136.62 |
| 3,3'-Bis(trimethoxysilyl)-dipropylamine | 34.16 |
| ε-caprolactone | 171.21 |
| Butyl Stannoic Acid | 1.36 |
| Charge B | |
| Dibutyl tin dilaurate | 0.12 |
| Charge C | |
| Phenyl isocyanate | 11.91 |
| Charge D | |
| Butyl acetate | 47.65 |

Charge A was added to a 500 mL, 4-necked flask equipped with a motor driven stainless steel stir blade, a water-cooled condenser, a nitrogen blanket, and a heating mantle with a thermometer connected through a temperature feedback control device. The reaction mixture was heated to 130° C. and held at 130° C. until IR spectroscopy showed the absence of the characteristic ε-caprolactone double peaks band (850 and 860 cm-1) using a ThermoScientific Nicolet iS5 FT-IR. After the reaction was complete, the reaction mixture was cooled to 70° C. At 70° C., charge B was added over 30 minutes and followed by an addition of charge C over 30 minutes. Charge D was added into the flask as a rinse of charge C. The reaction mixture was then held at 70° C. until IR spectroscopy showed the absence of the characteristic NCO band (2269 cm-1) using the ThermoScientific Nicolet iS5 FT-IR. The reaction product was cooled to room temperature and filtered through a paint strainer. The resulting silane functional polyester had a solids content of 58.20% and a Mw of 1413 g/mol. The Mw was determined as described in Example 1.

Example 4

Preparation of an Alkoxysilane Functional Polymer

An alkoxysilane functional polymer was prepared from the components listed in Table 4.

TABLE 4

| Component | Parts by weight |
|---|---|
| Charge A | |
| Butyl acetate | 51.94 |
| VYBAR ™ H-6164 polymer[2] | 51.94 |
| ε-caprolactone | 45.66 |
| Stannous octoate(Tin II) | 0.45 |
| Charge B | |
| SILQUEST ® A-link 35[1] | 10.26 |
| Charge C | |
| Butyl acetate | 20.53 |
| Charge D | |
| Phenyl isocyanate | 5.96 |
| Charge E | |
| Butyl acetate | 5.96 |

[2] A hydroxyl functional polyolefin oil, commercially available from Baker Hughes.

Charge A was added to a 500 mL, 4-necked flask equipped with a motor driven stainless steel stir blade, a water-cooled condenser, a nitrogen blanket, and a heating mantle with a thermometer connected through a temperature feedback control device. The reaction mixture was heated to 130° C. and held at 130° C. until IR spectroscopy showed the absence of the characteristic ε-caprolactone double peaks band (850 and 860 cm$^{-1}$) using a ThermoScientific Nicolet iS5 FT-IR. After the reaction was complete, the reaction mixture was cooled to 70° C. At 70° C., charge B was added over 30 minutes followed by a rinse with Charge C. The reaction mixture was held at 70° C. until IR spectroscopy showed the absence of the characteristic NCO band (2269 cm-1) using the ThermoScientific Nicolet iS5 FT-IR. Charge D was added over 30 minutes followed by a rinse with Charge E. The reaction mixture was held at 70° C. until IR spectroscopy showed the absence of the characteristic NCO band (2269 cm-1) using the ThermoScientific Nicolet iS5 FT-IR. The reaction product was cooled to room temperature and filtered through a paint strainer. The resulting silane functional polyester had a solids content of 60.10% and a Mw of 6500 g/mol. The Mw was determined as described in Example 1.

Examples 5-8

Preparation of Coating Compositions

Four different coating compositions were prepared with the alkoxysilane functional polymers of Examples 1-4 as shown in Table 5.

TABLE 5

| Component | Example 5 (grams) | Example 6 (grams) | Example 7 (grams) | Example 8 (grams) |
|---|---|---|---|---|
| Polymer Example 1 | 0.2 | | | |
| Polymer Example 2 | | 0.2 | | |
| Polymer Example 3 | | | 0.2 | |
| Polymer Example 4 | | | | 0.2 |
| DI water | 0.95 | 0.95 | 0.95 | 0.95 |
| Dowanol PM | 98.55 | 98.55 | 98.55 | 98.55 |
| N,N-dimethylbenzenyl-amine | 0.2 | | | |
| 4.68% $HNO_3$ | | | 0.5 | |

The components listed in Table 5 of each of Examples 5-8 were independently weighed in a 250 mL container and mixed on a shaker.

Example 9

Application and Evaluation of Coatings

Soda lime glass substrates were first cleaned with isopropyl alcohol and then pre-treated with a plasma treatment using spraymation with the following conditions: gun distance 8 inches; pot pressure 6 psi; atomization air pressure 20 psi; traverse speed 1000; and fan air pressure 30 psi. Various coatings containing the compositions of Examples 5-8 were then independently applied over one-half of the substrate while maintaining the second half of the substrate uncoated. The coated portions of the substrate were cured at 100° C. for 10 minutes to form coatings over each of the substrates.

The water contact angles of the cured coatings were tested using a VCA optima contact angle measurement system available from AST Products, Inc. Water contact angles were tested before and after conducting a dry eraser abrasion test using a Taber model 5750 linear abrader at 60 cycles per minute having a CS-17 or other type of rubber stick and a 1 kg applied load in accordance with ASTM D6279-15. The results are shown in Table 6.

TABLE 6

| Composition used for coating | Initial WCA[3] | WCA after 500 cycles[4] | WCA after 1000 cycles[5] | WCA after 2000 cycles[6] |
|---|---|---|---|---|
| Example 5 | 68-70° | N/A | 27°-28° | N/A |
| Example 6 | 69° | 54° | N/A | 51° |
| Example 7 | 61° | N/A | N/A | 49° |
| Example 8 | 80° | 56° | N/A | 47° |

[3] Initial water contact angle (WCA).
[4] Water contact angle (WCA) after 500 cycles of eraser abrasion.
[5] Water contact angle (WCA) after 1000 cycles of eraser abrasion.
[6] Water contact angle (WCA) after 2000 cycles of eraser abrasion.

The coatings were also tested for anti-fingerprint performance by comparing fingerprints on the uncoated and coated part on the soda lime glass, and by comparing fingerprints on different coated soda lime glass substrates. The coatings formed from the compositions of Examples 5-8 all exhibited good anti-fingerprint performance. FIG. 1 illustrates the fingerprints on the coated and uncoated portions of the substrate coated with the composition of Example 6 at different magnifications. As shown in FIG. 1, fingerprints on the coated portions of the substrates were significantly reduced.

The present invention is also directed to the following clauses.

Clause 1: A substrate at least partially coated with an anti-fingerprint coating prepared from a coating composition comprising: (a) an organic solvent; and (b) an alkoxysilane functional polymer comprising at least one ester linkage and at least one urethane linkage, wherein the polymer is prepared from components comprising:
(i) an active hydrogen functional compound comprising a hydroxyl group, amino group, thiol group, or a combination thereof;
(ii) an intramolecular cyclic ester; and
(iii) an isocyanate functional compound,
wherein the active hydrogen functional compound (i), the isocyanate functional compound (iii), or both (i) and (iii) comprise one or more alkoxysilane functional groups.

Clause 2: The substrate according to clause 1, wherein the active hydrogen functional compound comprises a hydroxyl functional compound, and the isocyanate functional compound comprises an alkoxysilane functional group.

Clause 3: The substrate according to any one of clauses 1 or 2, wherein the alkoxysilane functional polymer is represented by Chemical Formula (I):

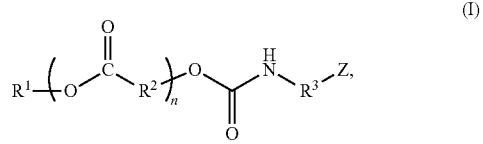

(I)

wherein n is a number from 5 to 50, $R^1$ is an alkyl group, aryl group, or an alkylaryl group, $R^2$ and $R^3$ are each independently an alkylene group, and Z is a group represented by

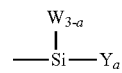

in which a is a number from 1 to 3, W is an alkyl group, and Y is an alkoxy group.

Clause 4: The substrate according to any one of clauses 1-3, wherein the intramolecular cyclic ester comprises a lactide, lactone, glycolide, or combination thereof.

Clause 5: The substrate according to clause 1, wherein the active hydrogen functional compound comprises an amino group and at least two alkoxysilane groups.

Clause 6: The substrate according to any one of clauses 1 or 5, wherein the isocyanate functional compound is free of alkoxysilane groups.

Clause 7: The substrate according to any one of clauses 1, 5, or 6, wherein the alkoxysilane functional polymer is represented by Chemical Formula (II):

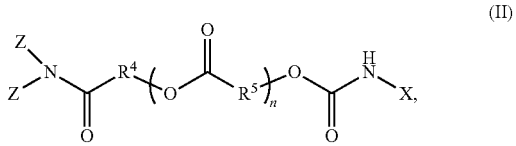

(II)

wherein n is a number from 5 to 50, $R^4$ and $R^5$ are each independently an alkylene group, X is an alkyl group, aryl group, or alkylaryl group, and each Z is independently a group represented

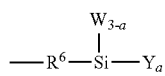

by in which a is a number from 1 to 3, $R^6$ is an alkylene group, W is an alkyl group, and Y is an alkoxy group.

Clause 8: The substrate according to clause 1, wherein the active hydrogen functional compound comprises an active hydrogen functional polymer comprising one or more hydroxyl groups, amino groups, thiol groups, or combinations thereof, and wherein the isocyanate functional compound comprises an alkoxysilane group.

Clause 9: The substrate according to clause 8, wherein the active hydrogen functional polymer is a branched polymer comprising at least three hydroxyl functional groups.

Clause 10: The substrate according to any one of clauses 1, 8, or 9, wherein the components for preparing the alkoxysilane functional polymer comprise at least two isocyanate functional compounds, and wherein a first isocyanate functional compound comprises an alkoxysilane group and a second isocyanate functional compound is free of alkoxysilane groups.

Clause 11: The substrate according to any one of clauses 1 and 8-10, wherein the alkoxysilane functional polymer comprises at least one terminal and/or pendant chain represented by Chemical Formula (III):

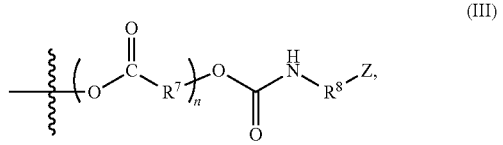

(III)

wherein n is a number from 5 to 50, $R^7$ and $R^8$ are each independently an alkylene group, and Z is a group represented by

in which a is a number from 1 to 3, W is an alkyl group, and Y is an alkoxy group.

Clause 12: The substrate according to any one of clauses 10 or 11, wherein the alkoxysilane functional polymer further comprises at least one terminal and/or pendant chain represented by Chemical Formula (IV):

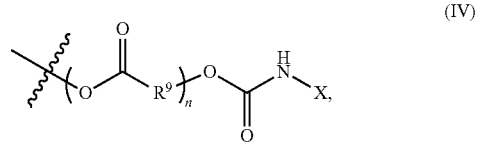

(IV)

wherein n is a number from 5 to 50, $R^9$ is an alkylene group and X is an alkyl group, aryl group, or alkylaryl group.

Clause 13: The substrate according to any one of clauses 1-12, wherein the alkoxysilane functional polymer has a weight average molecular weight of at least 500 g/mol.

Clause 14: The substrate according to any one of clauses 1-13, wherein the coating composition further comprises a catalyst.

Clause 15: The substrate according to any one of clauses 1-14, wherein the coating composition further comprises a silicone polymer.

Clause 16: The substrate according to any one of clauses 1-15, wherein the substrate is an electronic device.

Clause 17: The substrate according to any one of clauses 1-16, wherein the substrate comprises a touch screen or display that is at least partially coated with the anti-fingerprint coating.

Clause 18: An alkoxysilane functional polymer comprising at least one ester linkage, at least one urethane linkage, and at least two alkoxysilane functional groups, wherein the polymer is prepared from components comprising:
(i) an active hydrogen functional compound selected from: (a) an active hydrogen functional polymer comprising one or more hydroxyl groups, amino groups, thiol groups, or combinations thereof; (b) a non-polymeric compound comprising an amino group; or (c) a combination thereof;
(ii) an intramolecular cyclic ester; and
(iii) an isocyanate functional compound,
wherein the active hydrogen functional compound (i), the isocyanate functional compound (iii), or both (i) and (iii) comprise one or more alkoxysilane groups.

Clause 19: The alkoxysilane functional polymer according to clause 18, wherein the active hydrogen functional compound comprises an amino group and at least two alkoxysilane groups.

Clause 20: The alkoxysilane functional polymer according to clause 18 or 19, wherein the alkoxysilane functional polymer is represented by Chemical Formula (II):

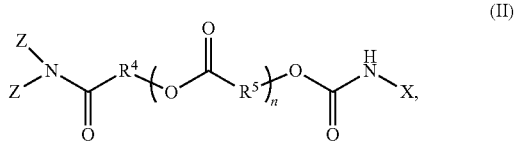

(II)

wherein n is a number from 5 to 50, $R^4$ and $R^5$ are each independently an alkylene group, X is an alkyl group, aryl group, or alkylaryl group, and each Z is independently a group represented by

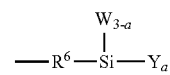

in which a is a number from 1 to 3, $R^6$ is an alkylene group, W is an alkyl group, and Y is an alkoxy group.

Clause 21: The alkoxysilane functional polymer according to clause 18, wherein the active hydrogen functional compound comprises an active hydrogen functional polymer comprising one or more hydroxyl groups, amino groups, thiol groups, or combinations thereof, and wherein the isocyanate functional compound comprises an alkoxysilane group.

Clause 22: The alkoxysilane functional polymer according to any one of clauses 18 or 21, wherein the active hydrogen functional polymer is a branched polymer comprising at least three hydroxyl functional groups.

Clause 23: The alkoxysilane functional polymer according to any one of clauses 18, 21, or 22, wherein the components for preparing the alkoxysilane functional polymer comprise at least two isocyanate functional compounds, and wherein a first isocyanate functional compound comprises an alkoxysilane group and a second isocyanate functional compound is free of alkoxysilane functional groups.

Clause 24: The alkoxysilane functional polymer according to any one of clauses 18 and 21-23, wherein the alkoxysilane functional polymer comprises at least one terminal and/or pendant chain represented by Chemical Formula (III):

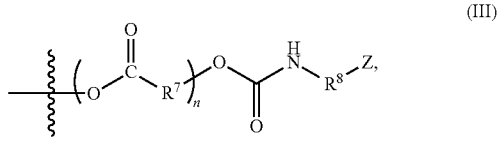

(III)

wherein n is a number from 5 to 50, $R^7$ and $R^8$ are each independently an alkylene group, and Z is a group represented by

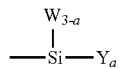

in which a is a number from 1 to 3, W is an alkyl group, and Y is an alkoxy group.

Clause 25: The alkoxysilane functional polymer according to any one of clauses 23 or 24, wherein the alkoxysilane functional polymer further comprises at least one terminal and/or pendant chain represented by Chemical Formula (IV):

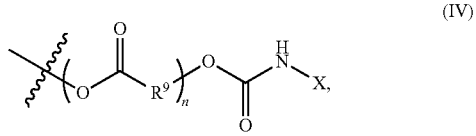

(IV)

wherein n is a number from 5 to 50, $R^9$ is an alkylene group and X is an alkyl group, aryl group, or alkylaryl group.

Clause 26: The alkoxysilane functional polymer according to any one of clauses 18-25, wherein the alkoxysilane functional polymer has a weight average molecular weight of at least 500 g/mol.

Clause 27: The alkoxysilane functional polymer according to any one of clauses 18-26, wherein the intramolecular cyclic ester comprises a lactide, lactone, glycolide, or combination thereof.

Clause 28: A coating composition comprising: (a) an organic solvent; and (b) at least one alkoxysilane functional polymer according to any one of clauses 18-27.

Clause 29: The coating composition according to clause 28, further comprising a catalyst.

Whereas particular embodiments of this invention have been described above for purposes of illustration, it will be evident to those skilled in the art that numerous variations of the details of the present invention may be made without departing from the invention as defined in the appended claims.

The invention claimed is:

1. An alkoxysilane functional polymer, wherein the polymer is prepared from components comprising:

(i) an active hydrogen functional compound comprising an amino group and at least two alkoxysilane groups;
(ii) at least 30 weight % of an intramolecular cyclic ester, based on the total weight of reactive components used to form the alkoxysilane functional polymer; and
(iii) an isocyanate functional compound, wherein the active hydrogen functional compound (i) is reacted with the intramolecular cyclic ester (ii) to form a reaction product and the reaction product is reacted with one or more isocyanate functional compounds (iii) to produce the alkoxysilane functional polymer, and wherein the alkoxysilane functional polymer is represented by Chemical Formula (II):

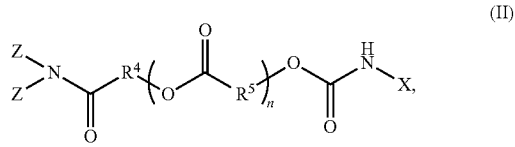

(II)

wherein n is a number from 5 to 50, $R^4$ and $R^5$ are each independently an alkylene group, X is an alkyl group, aryl group, or alkylaryl group, and each Z is independently a group represented by

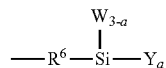

in which a is a number from 1 to 3, $R^6$ is an alkylene group, W is an alkyl group, and Y is an alkoxy group.

2. A substrate at least partially coated with an anti-fingerprint coating prepared from a coating composition comprising:

(a) at least 50 weight % of an organic solvent, based on the total weight of the coating composition; and
(b) an alkoxysilane functional polymer, wherein the polymer is prepared from components comprising:
 (i) an active hydrogen functional compound comprising an amino group and at least two alkoxysilane groups;
 (ii) at least 30 weight % of an intramolecular cyclic ester, based on the total weight of reactive components used to form the alkoxysilane functional polymer; and
 (iii) an isocyanate functional compound free of alkoxysilane groups, wherein the active hydrogen functional compound (i) is reacted with the intramolecular cyclic ester (ii) to form a reaction product and the reaction product is reacted with one or more isocyanate functional compounds (iii) to produce the alkoxysilane functional polymer, and wherein the alkoxysilane functional polymer is represented by Chemical Formula (II):

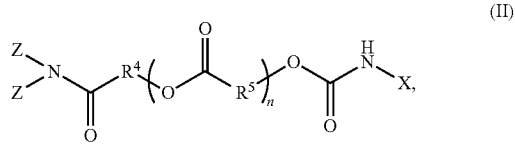

(II)

wherein n is a number from 5 to 50, $R^4$ and $R^5$ are each independently an alkylene group, X is an alkyl group, aryl group, or alkylaryl group, and each Z is independently a group represented by

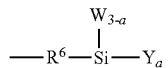

in which a is a number from 1 to 3, $R^6$ is an alkylene group, W is an alkyl group, and Y is an alkoxy group.

3. The substrate according to claim 2, wherein the substrate is an electronic device.

4. The substrate according to claim 2, wherein the substrate comprises a touch screen or display that is at least partially coated with the anti-fingerprint coating.

* * * * *